United States Patent
Morita

(10) Patent No.: US 9,826,562 B2
(45) Date of Patent: Nov. 21, 2017

(54) COMMUNICATION CONTROL METHOD, USER TERMINAL, PROCESSOR, STORAGE MEDIUM, AND BASE STATION FOR D2D COMMUNICATION

(71) Applicant: KYOCERA CORPORATION, Kyoto (JP)

(72) Inventor: Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 238 days.

(21) Appl. No.: 14/699,972

(22) Filed: Apr. 29, 2015

(65) Prior Publication Data

US 2015/0319793 A1 Nov. 5, 2015

Related U.S. Application Data

(63) Continuation of application No. 14/405,241, filed as application No. PCT/JP2013/065745 on Jun. 6, 2013, now abandoned.

(Continued)

(51) Int. Cl.
*H04W 76/02* (2009.01)
*H04W 8/00* (2009.01)
(Continued)

(52) U.S. Cl.
CPC ......... *H04W 76/023* (2013.01); *H04W 8/005* (2013.01); *H04W 72/1252* (2013.01); *H04W 76/021* (2013.01); *H04W 92/18* (2013.01)

(58) Field of Classification Search
None
See application file for complete search history.

(56) References Cited

U.S. PATENT DOCUMENTS 8,731,590 B2 * 5/2014 Hakola ............... H04W 72/10
370/329
9,055,587 B2   6/2015 Huang
(Continued)

FOREIGN PATENT DOCUMENTS

EP   2741563 A1   6/2014
EP   2861027 A1   4/2015
(Continued)

OTHER PUBLICATIONS

An Office Action; "Notice of Reasons for Rejection," issued by the Japanese Patent Office dated Mar. 29, 2016, which corresponds to Japanese Patent Application No. 2014-520052 and is related to U.S. Appl. No. 14/699,972; with English language statement of relevance.

(Continued)

*Primary Examiner* — Anh Ngoc Nguyen
(74) *Attorney, Agent, or Firm* — Studebaker & Brackett PC

(57) ABSTRACT

A communication control method used for D2D communication that is direct inter-terminal communication performed by using a radio resource assigned from a base station, comprises a step A of securing, by a user terminal, a logical channel group for the D2D communication; a step B of notifying, by the user terminal, the base station of the logical channel group secured in the step A; and a step C of assigning, by the base station, a radio network temporary identifier for the D2D communication to the logical channel group notified in the step B.

6 Claims, 16 Drawing Sheets

Related U.S. Application Data

(60) Provisional application No. 61/656,166, filed on Jun. 6, 2012, provisional application No. 61/694,017, filed on Aug. 28, 2012.

(51) Int. Cl.
*H04W 72/12* (2009.01)
*H04W 92/18* (2009.01)

(56) References Cited

U.S. PATENT DOCUMENTS

| | | |
|---|---|---|
| 2009/0016249 A1 | 1/2009 | Li et al. |
| 2011/0268006 A1 | 11/2011 | Koskela et al. |
| 2013/0059595 A1 | 3/2013 | Okubo et al. |
| 2013/0107722 A1 | 5/2013 | Huang |

FOREIGN PATENT DOCUMENTS

| | | |
|---|---|---|
| JP | 2003-264871 A | 9/2003 |
| JP | 2005-323150 A | 11/2005 |
| JP | 2010-533429 A | 10/2010 |
| JP | 2011-228806 A | 11/2011 |
| WO | 2010/028690 A1 | 3/2010 |
| WO | 2010097645 A1 | 9/2010 |
| WO | 2011-015250 A1 | 2/2011 |
| WO | 2011/160480 A1 | 12/2011 |
| WO | 2013/181515 A2 | 12/2013 |

OTHER PUBLICATIONS

JP Office Action dated Oct. 18, 2016 from corresponding JP Appl No. 2014-520052 with concise statement of relevance, 4 pp.
ETRI, "A proposal for potential technologies for Release 12 and onwards," 3GPP RAN Workshop on Release 12 and Onwards, Ljubljana, Slovenia, Jun. 11-12, 2012, 13 pp.
E. Zeira, "Application reference for PAC," IEEE P802. 15-12-0230-01-0008, May 2012, 14 pp.
International Search Report; PCT/JP2013/065745; Sep. 3, 2013.
3GPP TR 22.803 V0.3.0 (May 2012); 3rd Generation Partnership Project; Technical Specification Group SA; Feasibility Study for Proximity Services (ProSe)(Release 12); pp. 1-24.
The extended European search report issued by the European Patent Office on Feb. 16, 2016, which corresponds to European Patent Application No. 13800890.9-1505 and is related to U.S. Appl. No. 14/699,972.
Communication pursuant to Article 94(3) EPC, dated Aug. 29, 2017, from corresponding EP Appl No. 13 800 890.9, 8 pp.

\* cited by examiner

COMMUNICATION CONTROL METHOD, USER TERMINAL, PROCESSOR, STORAGE MEDIUM, AND BASE STATION FOR D2D COMMUNICATION

TECHNICAL FIELD

The present disclosure relates to a communication control method, a user terminal, a processor, a storage medium, and a base station, which are used in a mobile communication system supporting D2D communication.

BACKGROUND ART

In 3GPP (3rd Generation Partnership Project) which is a project aiming to standardize a mobile communication system, the introduction of Device to Device (D2D) communication is discussed as a new function after release 12 (see Non-Patent Document 1).

In the D2D communication, a plurality of user terminals proximal to one another are able to perform direct communication with each other in the state where a radio connection with a network is established (in the state where synchronization is achieved). In addition, the D2D communication is also called Proximity Service communication.

PRIOR ART DOCUMENT

Non-Patent Document

Non-Patent Document 1: 3GPP technical report "TR 22.803 V0.3.0" May 2012

SUMMARY OF THE DISCLOSURE

However, the current 3GPP standards do not define specifications for appropriately controlling the D2D communication. Thus, there is a problem that the D2D communication and the cellular communication (radio communication between a user terminal and a base station) are difficult to be compatible with each other.

In this regard, the present disclosure provides a communication control method, a user terminal, a processor, a storage medium, and a base station, with which it is possible to appropriately control D2D communication.

According to an embodiment, a communication control method used for D2D communication that is direct inter-terminal communication performed by using a radio resource assigned from a base station, includes: a step A of securing, by the user terminal, a logical channel group for the D2D communication; a step B of notifying, by the user terminal, the base station of the logical channel group secured in the step A; and a step C of assigning, by the base station, a radio network temporary identifier for the D2D communication to the logical channel group notified in the step B.

According to the embodiment, a user terminal performing D2D communication that is direct inter-terminal communication performed by using a radio resource assigned from a base station, comprises: a control unit that secures a logical channel group for the D2D communication and notifies the base station of the logical channel group for the D2D communication.

According to the embodiment, a processor is provided in a user terminal performing D2D communication that is direct inter-terminal communication performed by using a radio resource assigned from a base station. The processor performs a process of securing a logical channel group for the D2D communication and notifying the base station of the logical channel group for the D2D communication.

According to the embodiment, a storage medium is provided in a user terminal performing D2D communication that is direct inter-terminal communication performed by using a radio resource assigned from a base station. The storage medium stores therein a program for causing the user terminal to perform a process of securing a logical channel group for the D2D communication and notifying the base station of the logical channel group for the D2D communication.

According to the embodiment, a base station used for D2D communication that is direct inter-terminal communication performed by using an assigned radio resource, comprises: a control unit that assigns a radio network temporary identifier for the D2D communication to a logical channel group for the D2D communication when the logical channel group for the D2D communication is notified from a user terminal.

DESCRIPTION OF THE EMBODIMENT

Overview of Embodiment

Figure 1:
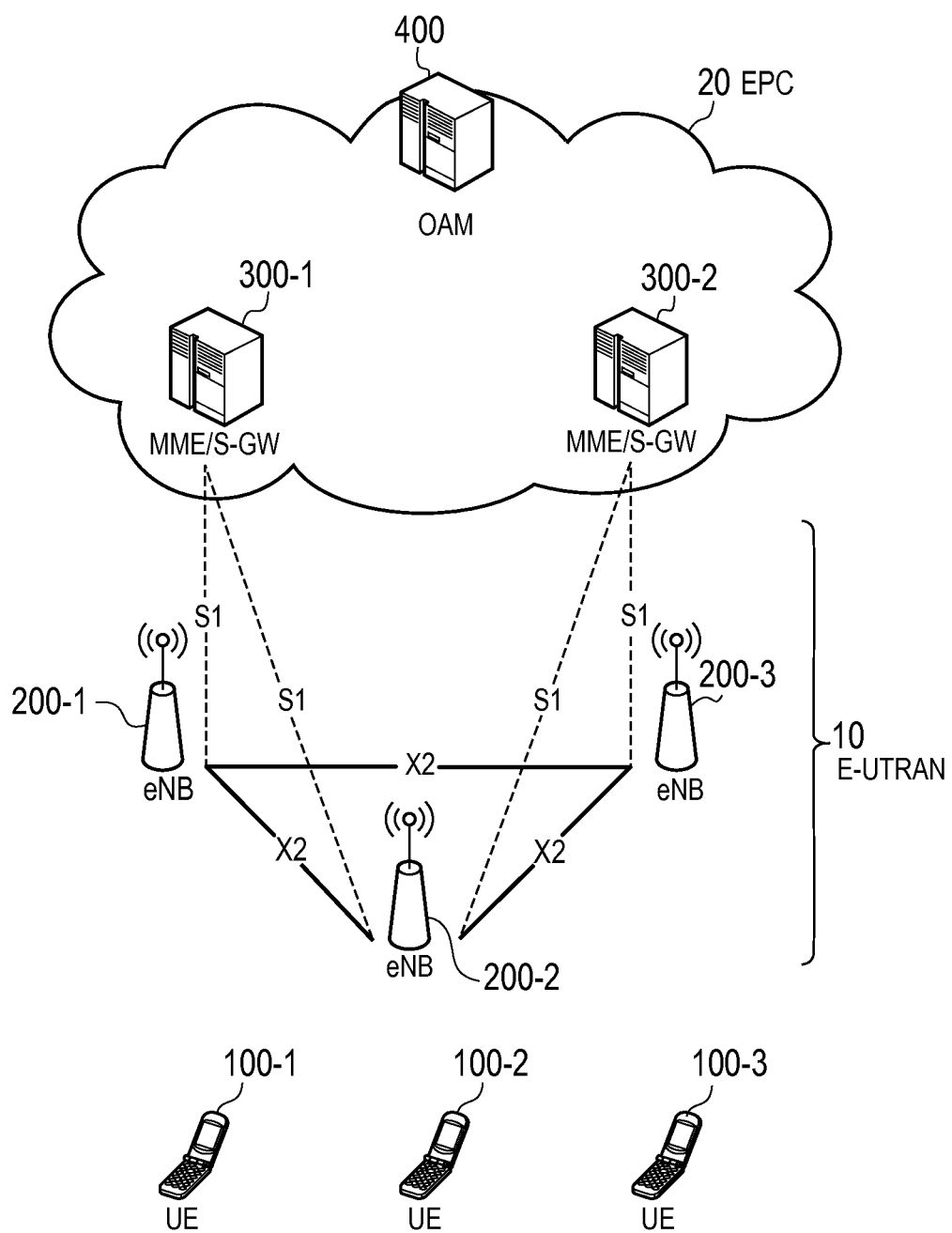
FIG. 1 is a configuration diagram of an LTE system.

A communication control method according to an embodiment is used for D2D communication that is direct inter-terminal communication performed by using a radio resource assigned from a base station. The communication control method includes: a step A of securing, by the user terminal, a logical channel group for the D2D communication; a step B of notifying, by the user terminal, the base station of the logical channel group secured in the step A; and a step C of assigning, by the base station, a radio network temporary identifier for the D2D communication to the logical channel group notified in the step B.

In this way, the base station is able to perform communication control (for example, radio resource assignment) for the D2D communication by using the radio network temporary identifier for the D2D communication. Consequently, it is possible to control the D2D communication separately from the cellular communication, so that it is possible to appropriately control the D2D communication.

In the step A, the user terminal may secure the logical channel group for the D2D communication with respect to an application to be used in the D2D communication.

In this way, the user terminal is able to transmit the application data in the D2D communication, separately from an application data in the cellular communication.

In the step A, the user terminal may secure the logical channel group for the D2D communication with respect to a combination of the application to be used in the D2D communication and other user terminals that are communication partners of the D2D communication.

In this way, it is possible to transmit the application data in the D2D communication by using logical channel groups different depending on each another user terminal that is the communication partner.

In the step A, the user terminal may further secure a hardware resource for the D2D communication with respect to the logical channel group for the D2D communication.

In this way, it is possible to separate the D2D communication from the cellular communication in the physical layer.

In the step A, the user terminal may secure the logical channel group for the D2D communication, separately from a logical channel group for the cellular communication, and in the step C, the base station may assign the radio network temporary identifier for the D2D communication, separately from a radio network temporary identifier for the cellular communication.

In this way, even when the user terminal simultaneously performs the cellular communication and the D2D communication, the base station is able to control the D2D communication, separately from the cellular communication.

The aforementioned communication control method may further include: a step D of determining, by the base station, a radio resource to be assigned to the D2D communication; and a step E of notifying, by the base station, the user terminal of the radio resource determined in the step D by using the radio network temporary identifier assigned in the step C.

In this way, the base station is able to notify the radio resource to be assigned to the D2D communication, separately from a radio resource to be assigned to the cellular communication.

The aforementioned communication control method may further include a step F of transmitting, by the user terminal, a buffer state report to the base station, the buffer state report indicating the amount of data waiting for transmission in the D2D communication, wherein in the step D, on the basis of the buffer state report, the base station may determine the radio resource to be assigned to the D2D communication.

In this way, the base station is able to appropriately perform the assignment of the radio resource in consideration of the amount of data waiting for transmission in the D2D communication.

First Embodiment

A description will be provided for an embodiment in which D2D communication is introduced to a mobile communication system (hereinafter, an "LIE system") configured in conformity to the 3GPP standards, below.

(1) Overview of LTE System

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. In the present embodiment, the E-UTRAN 10 and the EPC 20 configure a network.

The UE 100 is a mobile radio communication device and performs radio communication with a cell (a serving cell) with which a radio connection is established. The UE 100 corresponds to a user terminal.

The E-UTRAN 10 includes a plurality of eNBs 200 (evolved Node-Bs). The eNB 200 corresponds to a base station. The eNB 200 manages a cell and performs radio communication with the UE 100 which is established a radio connection with the cell.

In addition, the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MME (Mobility Management Entity)/S-GW (Serving-Gateway) 300 and OAM 400 (Operation and Maintenance).

The MME is a network node that performs various types of mobility control and the like for the UE 100 and corresponds to a control station. The S-GW is a network node that performs transfer control of user data and corresponds to a mobile switching center.

The eNBs 200 are connected mutually via an X2 interface. Furthermore, the eNBs 200 are connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
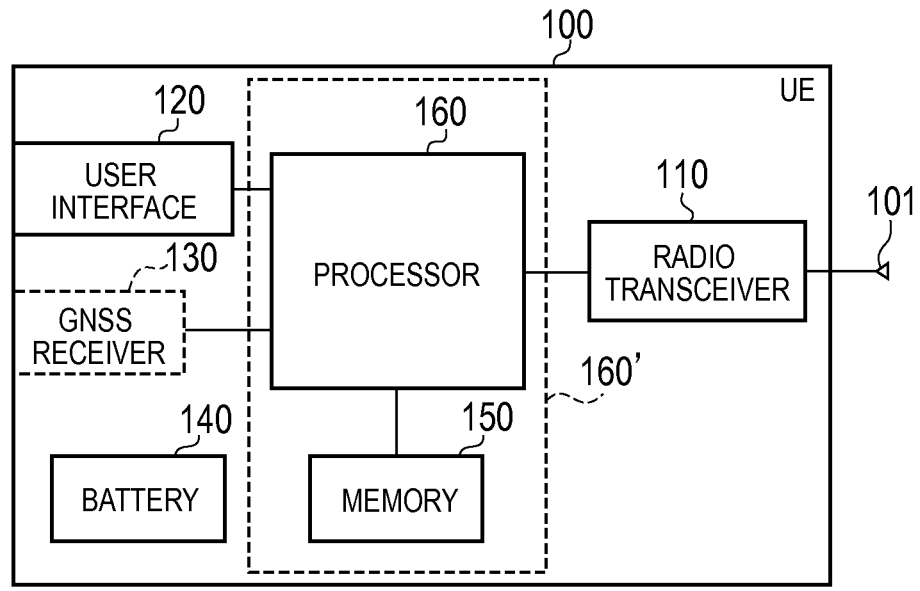
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 corresponds to a storage medium.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used for transmission/reception of a radio signal. The antenna 101 includes a plurality of antenna elements. The radio transceiver 110 converts a baseband signal output from the processor 160 into a radio signal, and transmits the radio signal from the antenna 101. Furthermore, the radio transceiver 110 converts a radio signal received in the antenna 101 into a baseband signal, and outputs the baseband signal to the processor 160.

The user interface 120 is an interface with a user carrying the UE 100, and for example, includes a display, a microphone, a speaker, and various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates power to be supplied to each block of the UE 100.

The memory 150 stores a program to be executed by the processor 160 and information to be used for a process by the processor 160.

The processor 160 includes a baseband processor configured to perform modulation/demodulation, coding/decoding and the like of the baseband signal, and CPU (Central Processing Unit) configured to perform various processes by executing the program stored in the memory 150. Moreover, the processor 160 may include a codec configured to perform coding/decoding of a voice/video signal.

The processor 160, for example, implements various communication protocols which will be described later, as well as implementing various applications. Details of the processes performed by the processor 160 will be described later.

Figure 3:
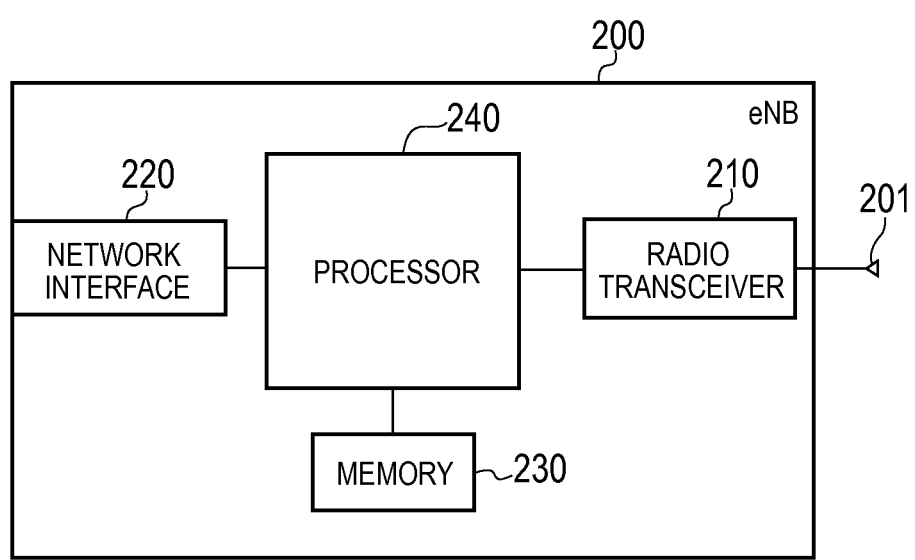
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. Note that the memory 230 may be integrally formed with the processor 240, and this set (that is, a chipset) may be called a processor.

The antenna 201 and the radio transceiver 210 are used for transmission/reception of a radio signal. The antenna 201 includes a plurality of antenna elements. The radio transceiver 210 converts a baseband signal output from the processor 240 into a radio signal, and transmits the radio signal from the antenna 201. Furthermore, the radio transceiver 210 converts a radio signal received in the antenna 201 into a baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor configured to perform modulation/demodulation, coding/decoding and the like of the baseband signal, and CPU configured to perform various processes by executing the program stored in the memory 230.

The processor 240, for example, implements various communication protocols which will be described later. Details of the processes performed by the processor 240 will be described later.

Figure 4:
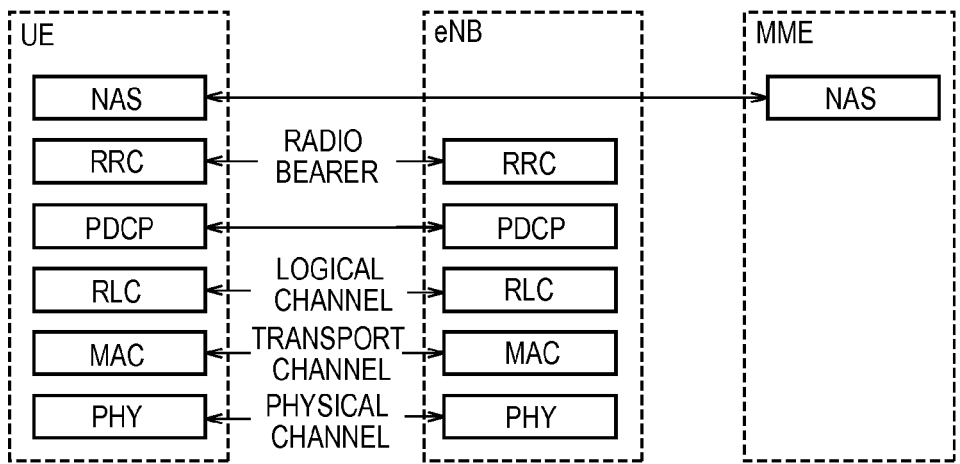
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs coding/decoding, modulation/demodulation, antenna mapping/demapping, and resource mapping/demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a MAC scheduler for determining a transport format (a transport block size, a modulation and coding scheme, and the like) and a resource block of an uplink and a downlink.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression/extension and encryption/decryption.

The RRC layer is defined only in a control plane. Between the RRC layer of the UE 100 and the RRC layer of the eNB 200, data is transmitted through a radio bearer. The RRC layer controls the logical channel, the transport channel, and the physical channel in response to establishment, re-establishment, and release of the radio bearer. When there is an RRC connection between RRC of the UE 100 and RRC of the eNB 200, the UE 100 is in an RRC connected state. Otherwise, the UE 100 is in an RRC idle state.

A NAS (Non-Access Stratum) layer positioned above the RRC layer performs session management, mobility management and the like.

Figure 5:
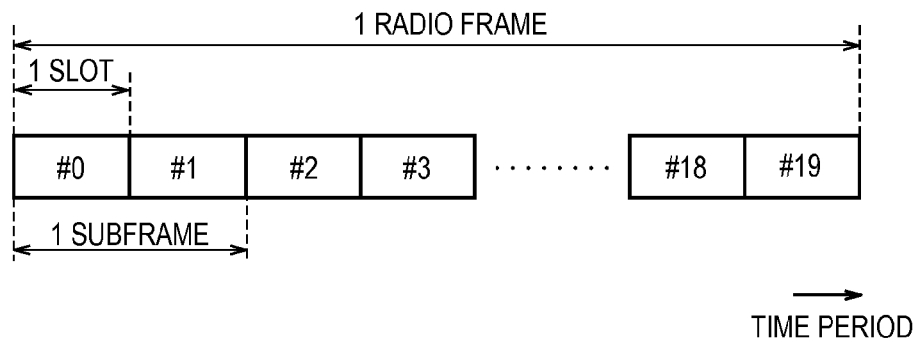
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame includes 10 subframes arranged in a time-period direction, wherein each subframe includes two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP).

In the downlink, an interval of several symbols at the head of each subframe is a control region mainly used as a physical downlink control channel (PDCCH). Furthermore, the other interval of each subframe is a region mainly used as a physical downlink shared channel (PDSCH).

In the uplink, both end portions in the frequency direction of each subframe are control regions mainly used as a physical uplink control channel (PUCCH). Furthermore, the center portion in the frequency direction of each subframe is a region mainly used as a physical uplink shared channel (PUSCH).

(2) Overview of D2D Communication

Next, the LTE system will be described with comparing the normal communication (the cellular communication) with the D2D communication.

Figure 6:
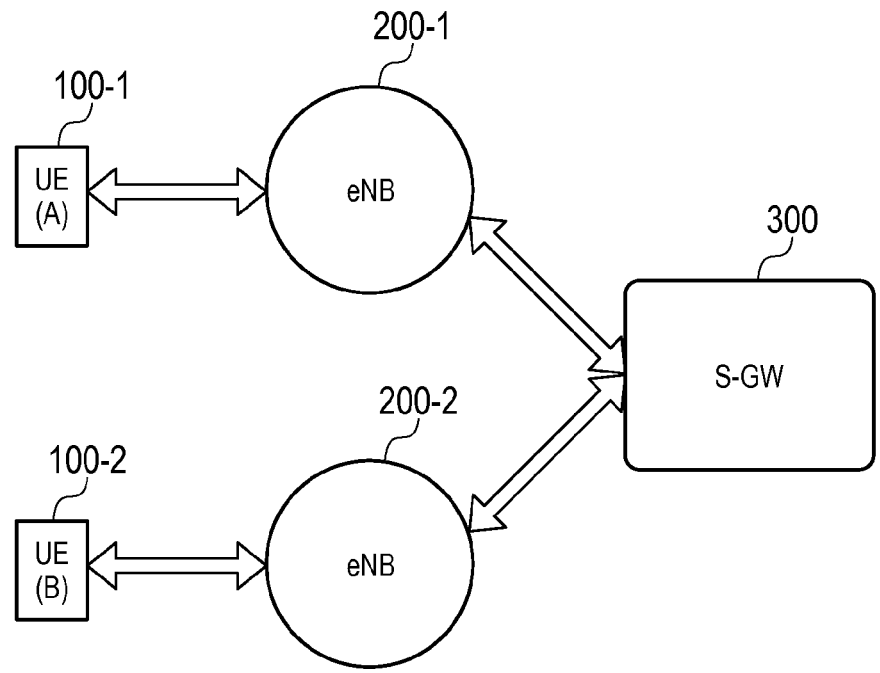
FIG. 6 illustrates a data path in cellular communication.

FIG. 6 illustrates a data path in the cellular communication. Furthermore, FIG. 6 illustrates the case in which the cellular communication is performed between UE (A) 100-1 which is established a radio connection with eNB 200-1 and UE (B) 100-2 which is established a radio connection with eNB 200-2. In addition, the data path indicates a data transfer path of user data (a user plane).

As illustrated in FIG. 6, the data path of the cellular communication passes through the network. Specifically, the data path via the eNB 200-1, the S-GW 300, and the eNB 200-2 is set.

Figure 7:
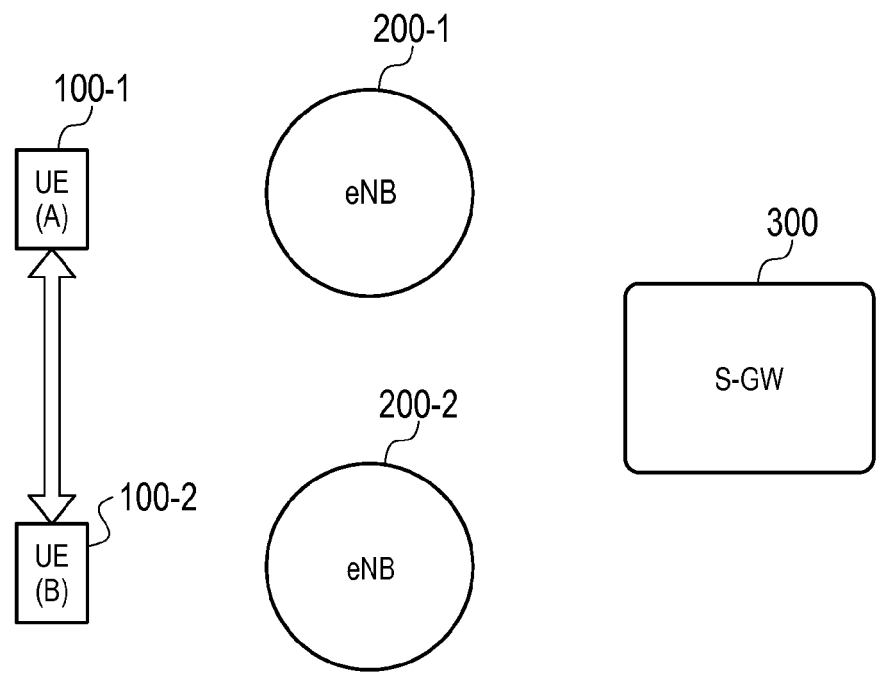
FIG. 7 illustrates a data path in D2D communication.

FIG. 7 illustrates a data path in the D2D communication. Furthermore, FIG. 7 illustrates the case in which the D2D communication is performed between the UE (A) 100-1 which is established a radio connection with the eNB 200-1 and the UE (B) 100-2 which is established a radio connection with the eNB 200-2.

As illustrated in FIG. 7, the data path of the D2D communication does not pass through the network. That is, direct radio communication is performed between the UEs. In this way, when the UE (B) 100-2 exists in the vicinity of the UE (A) 100-1, the D2D communication is performed between the UE (A) 100-1 and the UE (B) 100-2, thereby obtaining an effect that a traffic load of the network and a battery consumption amount of the UE 100 are reduced and so on.

In addition, the D2D communication is assumed to be performed in the frequency band of the LTE system, and for example, in order to avoid interference to the cellular communication, the D2D communication is performed under the control of the network.

(3) Operation According to First Embodiment

Hereinafter, the operation according to the first embodiment will be described.

(3.1) Search Operation

The UE (A) desiring to start the D2D communication should have a (Discover) function of discovering the UE (B) that is a communication partner existing in the vicinity of the UE (A). Furthermore, the UE (B) should have a (Discoverable) function of being discovered by the UE (A).

In the present embodiment, the UE (A) periodically transmits a search signal (a Discover signal) to around the UE (A) in order to discover the UE (B) that is a communication partner. In order to be discovered by the UE (A), the UE (B) waits for the search signal and transmits a response signal to the UE (A) in response to the reception of the search signal. Then, the network determines whether the D2D communication by the UE (A) and the UE (B) is possible.

(3.1.1) Operation Pattern 1

Figure 8:
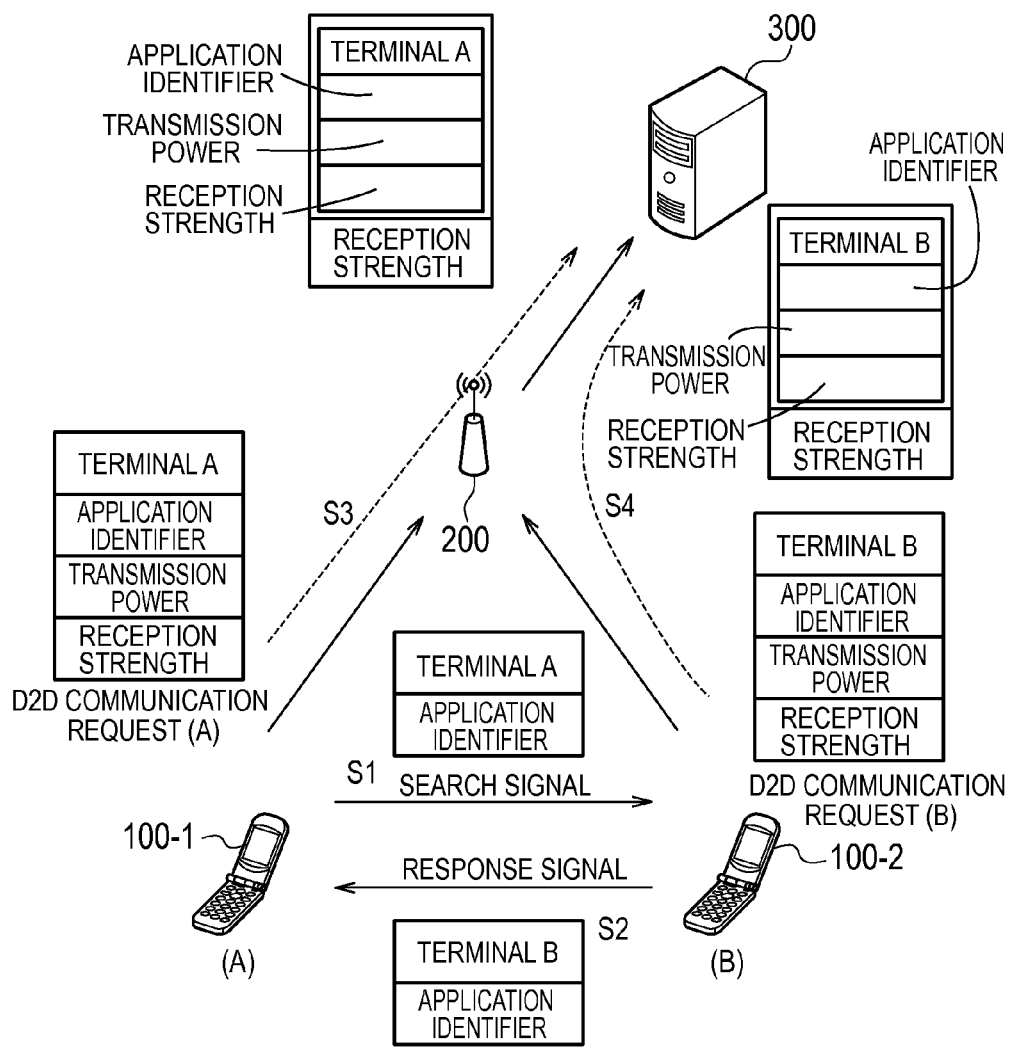
FIG. 8 is a sequence diagram of a search operation pattern 1 according to a first embodiment.

FIG. 8 is a sequence diagram of a search operation pattern 1 according to the present embodiment.

As illustrated in FIG. 8, in step S1, the UE (A) 100-1 transmits a search signal to around the UE (A) 100-1. The search signal includes an identifier of the UE (A) 100-1 and an identifier of an application to be used in the D2D communication. The identifier of the application, for example, is used in order to limit UE (UE which will transmit a response signal) which will respond to the search signal. The search signal may further include an identifier of the UE (B) 100-2 that is a communication partner, or an identifier of a group (a D2D communication group) of the UE 100 which will perform the D2D communication. Furthermore, when transmitting the search signal, the UE (A) 100-1 stores transmission power of the search signal.

The UE (B) 100-2 waits for the search signal and receives the search signal from the UE (A) 100-1. The UE (B) 100-2 measures received power (reception strength) of the search signal and stores the measured received power.

In step S2, the UE (B) 100-2 transmits a response signal to the UE (A) in response to the reception of the search signal. The response signal includes an identifier of the UE (B) 100-2 and an identifier of an application to be used in the D2D communication. Furthermore, when transmitting the response signal, the UE (B) 100-2 stores transmission power of the response signal.

The UE (A) 100-1 waits for the response signal and receives the response signal from the UE (B) 100-2. The UE (A) 100-1 measures received power (reception strength) of the response signal and stores the measured received power.

In step S3, in response to the reception of the response signal, the UE (A) 100-1 transmits, to the eNB 200, a D2D communication request (A) indicating that the start of the D2D communication is desired. The D2D communication request (A) includes the identifier of the UE (A) 100-1 and the identifier of the application to be used in the D2D communication. The D2D communication request (A) further includes information on the transmission power of the search signal and information on the received power of the response signal.

When the D2D communication request (A) is received, the eNB 200 measures received power of the D2D communication request (A), adds information on the measured received power to the D2D communication request (A), and transfers the D2D communication request (A) to the MME/S-GW 300.

In step S4, in response to the transmission of the response signal, the UE (B) 100-2 transmits, to the eNB 200, a D2D communication request (B) indicating that the start of the D2D communication is desired. The D2D communication request (B) includes the identifier of the UE (B) 100-2 and the identifier of the application to be used in the D2D communication. The D2D communication request (B) further includes information on the transmission power of the response signal and information on the received power of the search signal.

When the D2D communication request (B) is received, the eNB 200 measures received power of the D2D communication request (B), adds information on the measured received power to the D2D communication request (B), and transfers the D2D communication request (B) to the MME/S-GW 300.

When the D2D communication request (A) and the D2D communication request (B) are received, the MME/S-GW 300 determines whether the D2D communication by the UE (A) 100-1 and the UE (B) 100-2 is possible on the basis of a distance between the UEs, a distance between the UE and the eNB, application characteristics and the like, which are obtained from the D2D communication request (A) and the D2D communication request (B). For example, the MME/S-GW 300 determines whether the D2D communication is possible by at least one of the following first determination reference to third determination reference.

Firstly, when the UE (B) 100-2 does not exist in the vicinity of the UE (A) 100-1, the MME/S-GW 300 determines that the D2D communication is not possible. This is because the D2D communication is basically performed between neighboring UEs 100, and interference and a battery consumption amount are increased when the D2D communication is performed between UEs 100 remote from each other.

For example, since it is possible to know propagation loss by the difference between the transmission power of the search signal included in the D2D communication request (A) and the received power of the search signal included in the D2D communication request (B), the MME/S-GW 300 is able to estimate a distance between the UE (A) 100-1 and the UE (B) 100-2 on the basis of the propagation loss. Similarly, since it is possible to know propagation loss by the difference between the transmission power of the response signal included in the D2D communication request (B) and the received power of the response signal included in the D2D communication request (A), the MME/S-GW 300 is able to estimate the distance between the UE (A) 100-1 and the UE (B) 100-2 on the basis of the propagation loss.

In addition, when the transmission power of the search signal and the transmission power of the response signal are each uniformly defined in an entire system in advance, information on the transmission power may not be included in the D2D communication request.

Secondly, when the eNB 200 exists in the vicinity of the UE (A) 100-1 or the eNB 200 exists in the vicinity of the UE (B) 100-2, the MME/S-GW 300 determines that the D2D communication is not possible. This is because interference to the eNB 200 is increased when the D2D communication is performed in the vicinity of the eNB 200.

For example, since it is possible to know rough propagation loss from received power when the eNB 200 received the D2D communication request (A), the MME/S-GW 300 is able to estimate the distance between the UE (A) 100-1 and the eNB 200 on the basis of the propagation loss. Similarly, since it is possible to know rough propagation loss from received power when the eNB 200 received the D2D communication request (B), the MME/S-GW 300 is able to estimate the distance between the UE (B) 100-2 and the eNB 200 on the basis of the propagation loss. In addition, in order to accurately obtain the propagation loss, the transmission power of the D2D communication request may be notified from the UE.

Thirdly, in the case of an application that generates temporary traffic or in a small amount (a low load), the MME/S-GW 300 determines that the D2D communication is not possible. In other words, only in the case of an application that generates continuous traffic with a large capacity (a high load), the MME/S-GW 300 determines that the D2D communication is possible. This is because a merit of the D2D communication may not be sufficiently achieved when treating traffic temporarily or in a low load.

For example, since a streaming or video communication application generates continuous traffic with a high load, the MME/S-GW 300 determines that the D2D communication is possible. Details thereof will be described later, but the D2D communication may also be applied to the application that generates the traffic temporarily or in a small amount (a low load).

When it is determined that the D2D communication by the UE (A) 100-1 and the UE (B) 100-2 is possible, the MME/S-GW 300 notifies the eNB 200 of necessary information and the fact that the D2D communication is possible, so that the D2D communication is started under the control of the eNB 200.

According to the operation pattern 1, the D2D communication is possible only when the UE (A) 100-1 and the UE (B) 100-2 are in a state suitable for the D2D communication.

(3.1.2) Operation Pattern 2

The aforementioned operation pattern 1 assumes the case in which the UE (B) always waits for the search signal. However, for example, it is possible to assume the case of stopping waiting for the search signal in order to reduce a battery consumption amount. In this regard, in the operation pattern 2, it is assumed that UE (A) is able to discover UE (B) in such a sleep state of the D2D communication.

Figure 9:
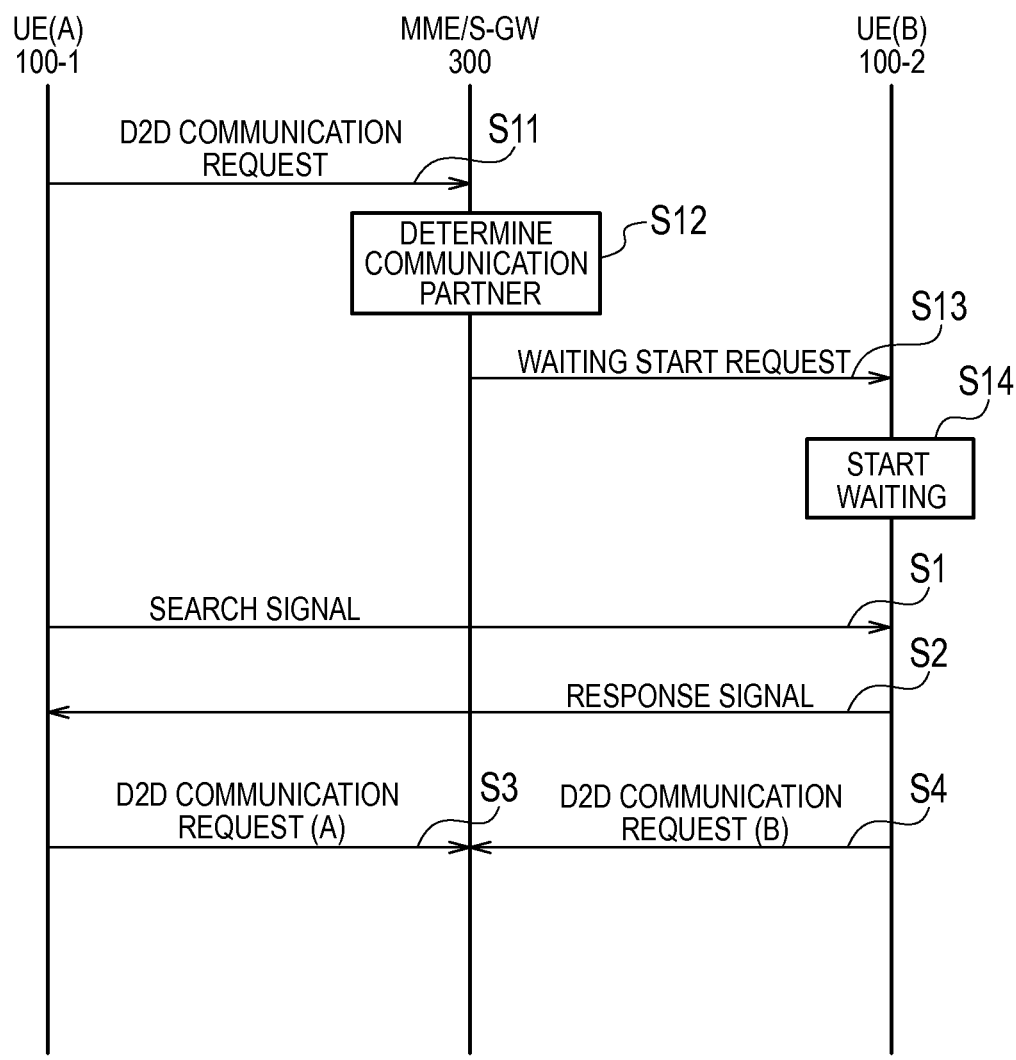
FIG. 9 is a sequence diagram of a search operation pattern 2 according to the first embodiment.

FIG. 9 is a sequence diagram of the search operation pattern 2 according to the present embodiment.

As illustrated in FIG. 9, in step S11, the UE (A) 100-1 transmits, to the eNB 200, a D2D communication request indicating that the start of the D2D communication is desired. The eNB 200 transfers the D2D communication request from the UE (A) 100-1 to the MME/S-GW 300. The D2D communication request includes the identifier of the UE (A) 100-1 and the identifier of the application to be used in the D2D communication. The D2D communication request may further include an identifier of the UE (B) 100-2 that is a communication partner, or an identifier of a group (a D2D communication group) of the UE 100 which will perform the D2D communication.

The UE (A) 100-1 transmits the D2D communication request and also starts the transmission of the search signal. Alternatively, the UE (A) 100-1 starts the transmission of the search signal at the timing at which a response for the D2D communication request was received from the network (the eNB 200 or the MME/S-GW 300). This is because it is assumed that a waiting instruction is reached from the network to the UE (B) 100-2 at this timing.

In step S12, the MME/S-GW 300 designates UE (B) 100-2, which satisfies the D2D communication request from the UE (A) 100-1, among UEs 100 existing in a camping area (or a camping cell) of the UE (A) 100-1. Furthermore, the MME/S-GW 300 confirms the state of the UE (B) 100-2 so as to determine whether the waiting for the search signal is in progress or being cancelled. Hereinafter, the following description will be given on the assumption that the UE (B) 100-2 stops waiting for the search signal.

In step S13, the MME/S-GW 300 transmits, to the eNB 200, a waiting start request directed to the UE (B) 100-2. The eNB 200 transfers the waiting start request from the MME/S-GW 300 to the UE (B) 100-2.

In step S14, when the waiting start request is received, the UE (B) 100-2 starts to wait for the search signal. Specifically, the UE (B) 100-2 attempts the reception of the search signal at a predetermined cycle.

After starting to wait for the search signal, when the search signal from the UE (A) 100-1 is received (step S1), the UE (B) 100-2 transmits a response signal for the search signal to the UE (A) 100-1 (step S2). Subsequent operations are similar to those of the operation pattern 1.

According to the operation pattern 2, the UE (B) 100-2 even in the sleep state of the D2D communication can be discovered by the UE (A) 100-1.

(3.2) Radio Resource Assignment in D2D Communication

Next, an assignment operation of a radio resource in the D2D communication will be described. The "radio resource" indicates a resource block (RB) that is a unit of a time-frequency resource, that is, a frequency band. Furthermore, a modulation and coding scheme (MCS) in radio communication may be included in the "radio resource".

(3.2.1) Method of Assigning Radio Resource

The eNB 200 performs quasi-static radio resource assignment for the D2D communication. In the present embodiment, the eNB 200 determines a method of assigning radio resource in the D2D communication in response to the characteristics of an application that is used in the D2D communication.

Figure 10:
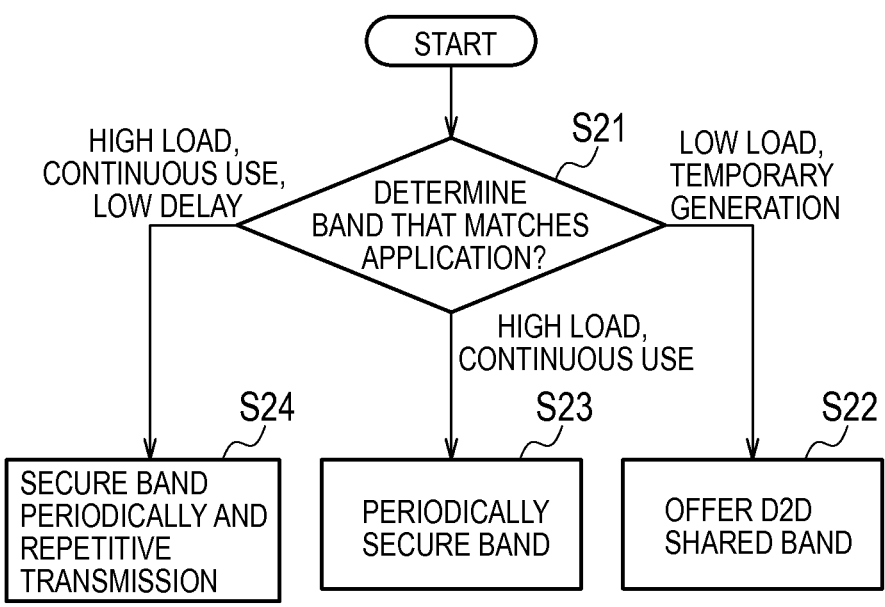
FIG. 10 is a flow diagram of a determination operation of a method of assigning radio resource according to the first embodiment.

FIG. 10 is a flow diagram of a determination operation of the method of assigning radio resource in the present embodiment. Before the present flow is performed, the eNB 200 acquires an identifier of the application, which is used in the D2D communication, from the MME/S-GW 300. Alternatively, the eNB 200 may acquire the identifier of the application, which is used in the D2D communication, from the UE 100 performing the D2D communication.

As illustrated in FIG. 10, in step S21, the eNB 200 recognizes the characteristics of the application from the identifier of the application that is used in the D2D communication. For example, the eNB 200 holds in advance a table, in which the identifier of the application is correlated with the characteristics thereof, and is able to recognize the characteristics of the application by using the table.

When traffic generated by the application used in the D2D communication produces a low load and is temporary (for example, in the case of a chat and the like), the eNB 200 determines to assign a radio resource, which is commonly used in another D2D communication, to the D2D communication in step S22. In this way, it is possible to save the radio resource. In this case, difference codes (spread codes) are assigned to each of various types of D2D communication to which the same radio resource is assigned, so that code division is possible. For example, a code 1 is assigned to a D2D communication pair 1 and a code 2 is assigned to a D2D communication pair 2, so that each pair is able to separate the information of one pair from the information of the other pair.

Furthermore, when the traffic generated by the application used in the D2D communication produces a high load and is continuous (for example, in the case of streaming and the like), the eNB 200 determines to periodically assign a dedicated radio resource to the D2D communication in step S23. In this way, it is possible to transmit a large amount of traffic in the D2D communication.

Moreover, when the traffic generated by the application used in the D2D communication has a high load, is continuous, and requires low delay (for example, video communication and the like), the eNB 200 determines assignment such that the dedicated radio resource is repeatedly transmitted in a cyclic manner, in step S24. In this way, it is possible to transmit a large amount of traffic in the D2D communication and also possible to enhance the reliability of communication. The repetitive transmission is not limited to a scheme for repeatedly transmitting the same data a plurality of times. For example, the repetitive transmission may include a scheme for changing a redundant bit whenever the radio resource is transmitted and repeatedly transmitting the radio resource (for example, an Incremental Redundancy scheme).

In accordance with the method of assigning radio resource according to the present embodiment, it is possible to appropriately assign the radio resource in the D2D communication in response to the characteristics of the application used in the D2D communication.

(3.2.2) Radio Resource Assignment Based on Buffer State Report

When the UE 100 simultaneously performs the cellular communication and the D2D communication, it is preferable that the eNB 200 is able to control radio resource assignment for the D2D communication, separately from the cellular communication. In the present embodiment, it is assumed that the radio resource assignment is controlled for the D2D communication, separately from the cellular communication.

Furthermore, in the cellular communication, there is a scheme in which the UE 100 transmits a buffer state report (BSR) to the eNB 200, and the eNB 200 controls the assignment of an uplink radio resource to the UE 100 on the basis of the BSR from the UE 100, the BSR indicating the amount of data waiting for transmission (a transmission buffer stay amount) to the eNB 200. In the present embodiment, it is assumed that the radio resource assignment is also controlled in the D2D communication on the basis of the BSR.

Hereinafter, a description will be provided for an operation for performing radio resource assignment control of the D2D communication by employing an example in which the UE (A) 100-1 performing only the cellular communication by using a plurality of applications switches a part of the applications to the D2D communication.

Figure 11:
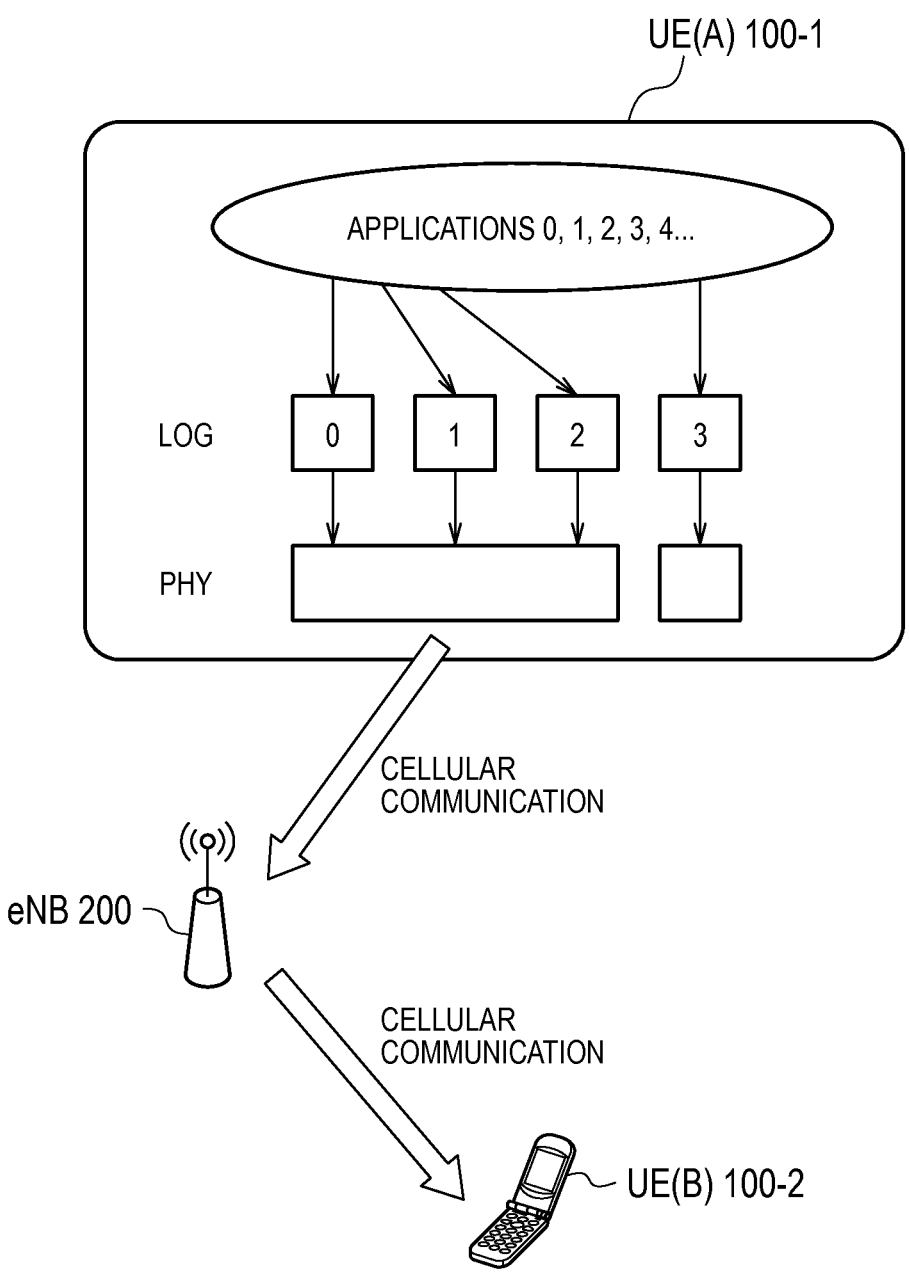
FIG. 11 is a diagram for explaining a radio resource assignment operation according to the first embodiment (part 1).

FIG. 11 is a diagram for explaining the operation of the UE (A) 100-1 performing only the cellular communication by using a plurality of applications.

As illustrated in FIG. 11, the UE (A) 100-1 implements applications 0, 1, 2, 3, . . . , and transmits traffic generated by each application and a control signal to the eNB 200 by using a plurality of logical channels. In the physical (PHY) layer, each logical channel is provided with a buffer for temporarily holding data transmitted through the logical channel.

The logical channels are grouped into a plurality of logical channel groups (LCG). In the example of FIG. 11, there are four LCGs of LCG 0 to LCG 3. When BSR is transmitted for each logical channel, since overhead is increased, the BSR is defined to be transmitted for each LCG.

The UE (A) 100-1 transmits the BSR to the eNB 200 for each of the LCG 0 to the LCG 3. A scheduler of the eNB 200 recognizes a transmission buffer stay amount indicated by the BSR for each of the LCG 0 to the LCG 3, and performs uplink radio resource assignment corresponding to the transmission buffer stay amount.

Figure 12:
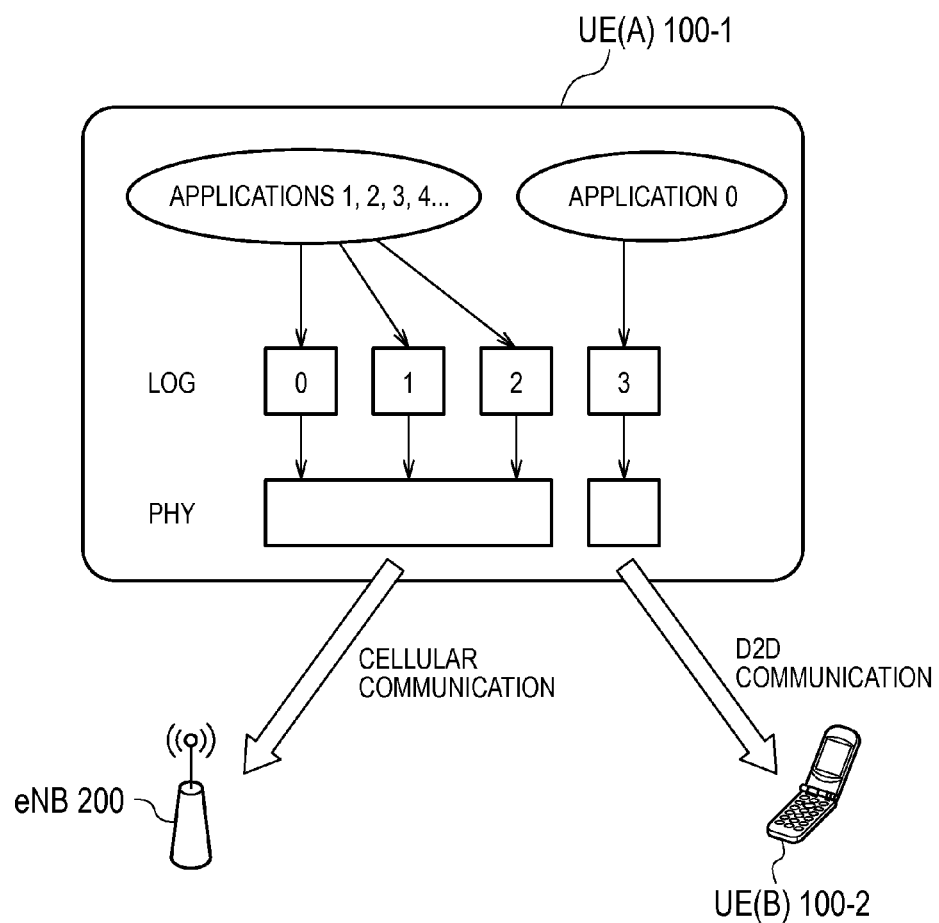
FIG. 12 is a diagram for explaining a radio resource assignment operation according to the first embodiment (part 2).

FIG. 12 is a diagram for explaining the operation of the UE (A) 100-1 when switching a part of the applications to the D2D communication with the UE (B) 100-2 from the situation of FIG. 11.

When switching a part of the applications to the D2D communication, the MME/S-GW 300 (or the eNB 200) designates an application (here, the application 0) to be used in the D2D communication, and notifies the UE (A) 100-1 of the designated application 0.

The UE (A) 100-1 sets certain LCG (here, the LCG 3) to be dedicated for the application 0. That is, the UE (A) 100-1 secures the LCG 3 of the D2D communication, in addition to the LCG 0 to the LCG 2 for the cellular communication.

Furthermore, the UE (A) 100-1 secures a hardware resource for the D2D communication with respect to the LCG 3 for the D2D communication. The hardware resource indicates a resource (a processing resource) of the processor 160 and a resource (a memory resource) of the memory 150.

Moreover, the UE (A) 100-1 notifies the eNB 200 of the LCG 3 for the D2D communication.

The eNB 200 assigns a radio network temporary identifier (RNTI) for the D2D communication to the LCG 3 for the D2D communication, which was notified from the UE (A) 100-1. The RNTI is a UE identifier that is temporarily provided for control. For example, the PDCCH includes RNTI of the UE 100 that is a transmission destination, and the UE 100 determines the presence or absence of radio resource assignment on the basis of the presence or absence of the RNTI of the UE 100 in the PDCCH.

Hereinafter, the RNTI for the D2D communication is called "D2D-RNTI". In this way, the eNB 200 assigns the D2D-RNTI to the UE (A) 100-1, in addition to RNTI (C-RNTI) for the cellular communication. As a consequence, the total two RNTIs (the C-RNTI and the D2D-RNTI) are assigned to the UE (A) 100-1, so that initial setting of the D2D communication is completed.

Figure 13:
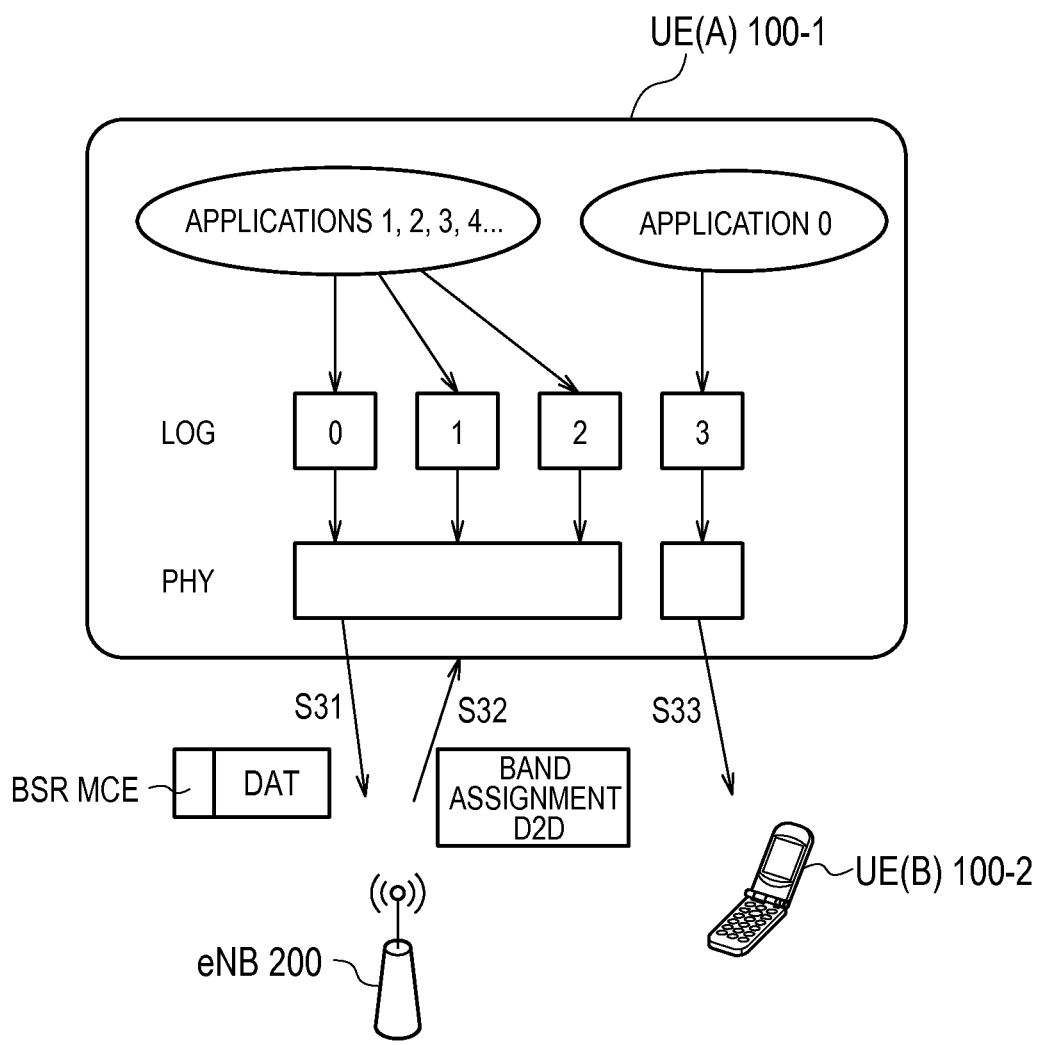
FIG. 13 is a diagram for explaining a radio resource assignment operation according to the first embodiment (part 3).

FIG. 13 is a diagram for explaining the operation of the UE (A) 100-1 during the D2D communication.

As illustrated in FIG. 13, in step S31, the UE (A) 100-1 transmits BSR MCE (MAC Control Element) to the eNB 200 together with transmission data (DAT) directed to the eNB 200. The BSR MCE includes BSRs of each of the LCG 0 to the LCG 3.

In step S32, on the basis of the BSR MCE, the eNB 200 recognizes a transmission buffer stay amount indicated by the BSR with respect to each of the LCG 0 to the LCG 3, and performs radio resource assignment corresponding to the transmission buffer stay amount for each of the LCG 0 to the LCG 3. Furthermore, on the basis of the transmission buffer stay amount for the LCG 3, the eNB 200 determines a radio resource to be assigned to the D2D communication. Then, the eNB 200 notifies the UE (A) 100-1 of the radio resource, which is to be assigned to the D2D communication, using the D2D-RNTI on the PDCCH.

In step S33, the UE (A) 100-1 transmits to the UE (B) 100-2 by using the radio resource assigned to the D2D communication.

In accordance with the radio resource assignment according to the present embodiment, it is possible to control radio resource assignment for the D2D communication, separately from the cellular communication. Furthermore, it is also possible to control the assignment of a radio resource in the D2D communication on the basis of the BSR.

(3.3) Transmission Power Control of D2D Communication

As described above, when the traffic generated by the application used in the D2D communication produces a high load and is continuous, a dedicated radio resource is periodically assigned to the D2D communication. The UE (A) 100-1 and the UE (B) 100-2 performing the D2D communication alternately use the periodically assigned radio resource for transmission. Furthermore, the UE (A) 100-1 and the UE (B) 100-2 may perform repetitive transmission in response to an error situation and the like.

Figure 14:
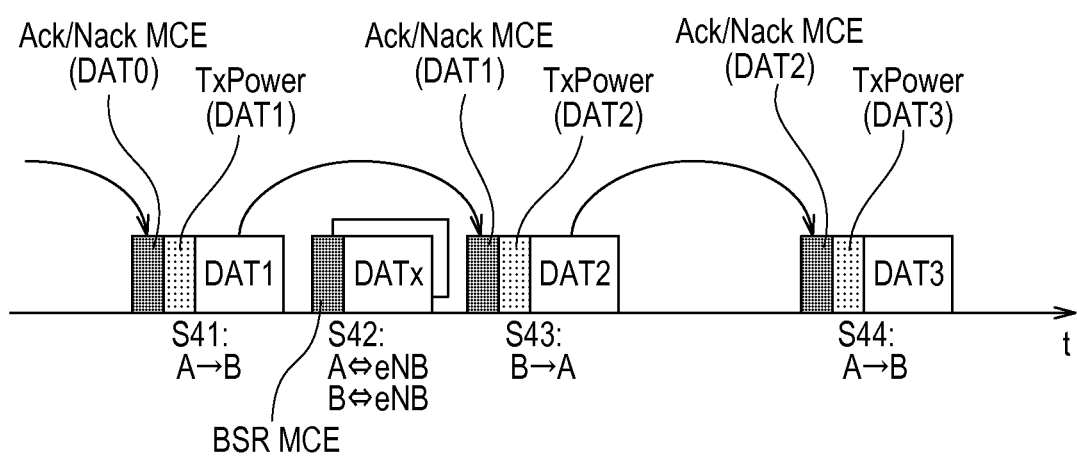
FIG. 14 is a diagram for explaining transmission power control and retransmission control according to the first embodiment.

FIG. 14 is a diagram for explaining transmission power control and retransmission control in the D2D communication. In FIG. 14, steps S41, S43, and S44 correspond to the D2D communication and step S42 corresponds to the cellular communication.

As illustrated in FIG. 14, in step S41, the UE (A) 100-1 transmits data 1 to the UE (B) 100-2. The UE (A) 100-1 transmits TxPower MCE including information on transmission power of the transmission together with the data 1. In this way, when transmitting a radio signal to the UE (B) 100-2, the UE (A) 100-1 notifies the UE (B) 100-2 of the transmission power. Furthermore, the UE (A) 100-1 transmits HARQ Ack/Nack MCE including information on HARQ Ack/Nack for data 0, which was received from the UE (B) 100-2 in previous time, together with the data 1.

When the data 1 is received from the UE (A) 100-1, the UE (B) 100-2 measures received power of the reception. Furthermore, on the basis of the difference between the measured received power and the transmission power indicated by the TxPower MCE transmitted together with the data 1, the UE (B) 100-2 determines transmission power when performing next transmission with respect to the UE (A) 100-1. For example, as the difference between the transmission power and the received power of the data 1 from the UE (A) 100-1 is large, since propagation loss is large, the UE (B) 100-2 determines the transmission power when performing the next transmission with respect to the UE (A) 100-1 to be large.

In step S42, each of the UE (A) 100-1 and the UE (B) 100-2 performs transmission of data to the eNB 200. As described above, the UE (A) 100-1 and the UE (B) 100-2 transmit the BSR MCE at the time of the transmission of the data to the eNB 200.

In step S43, the UE (B) 100-2 transmits data 2 to the UE (A) 100-1. The UE (B) 100-2 transmits TxPower MCE including information on transmission power of the transmission together with the data 2. In this way, when transmitting a radio signal to the UE (A) 100-1, the UE (B) 100-2 notifies the UE (B) 100-2 of the transmission power. Furthermore, the UE (B) 100-2 transmits HARQ Ack/Nack MCE including information on HARQ Ack/Nack for the data 1, which was received from the UE (A) 100-1 in previous time, together with the data 2.

When the data 2 is received from the UE (B) 100-2, the UE (A) 100-1 measures received power of the data 2. Furthermore, on the basis of the difference between the measured received power and the transmission power indicated by the TxPower MCE transmitted together with the data 2, the UE (A) 100-1 determines transmission power when performing next transmission with respect to the UE (B) 100-2.

In step S44, the UE (A) 100-1 transmits the data 3 to the UE (B) 100-2. The UE (A) 100-1 transmits TxPower MCE including information on transmission power of the transmission together with the data 3. Furthermore, the UE (A) 100-1 transmits HARQ Ack/Nack MCE including information on HARQ Ack/Nack for data 2, which was received from the UE (B) 100-2 in previous time, together with the data 3.

Such processes are repeated, so that the transmission power control and the retransmission control in the D2D communication are performed.

In addition, when the distance between the UE (A) 100-1 and the UE (B) 100-2 is increased by the movement of the UE (A) 100-1 and/or the UE (B) 100-2, transmission power in the D2D communication becomes large. In the present embodiment, when the transmission power in the D2D communication exceeds maximum transmission power, the D2D communication is controlled to be stopped and switched to the cellular communication.

Figure 15:
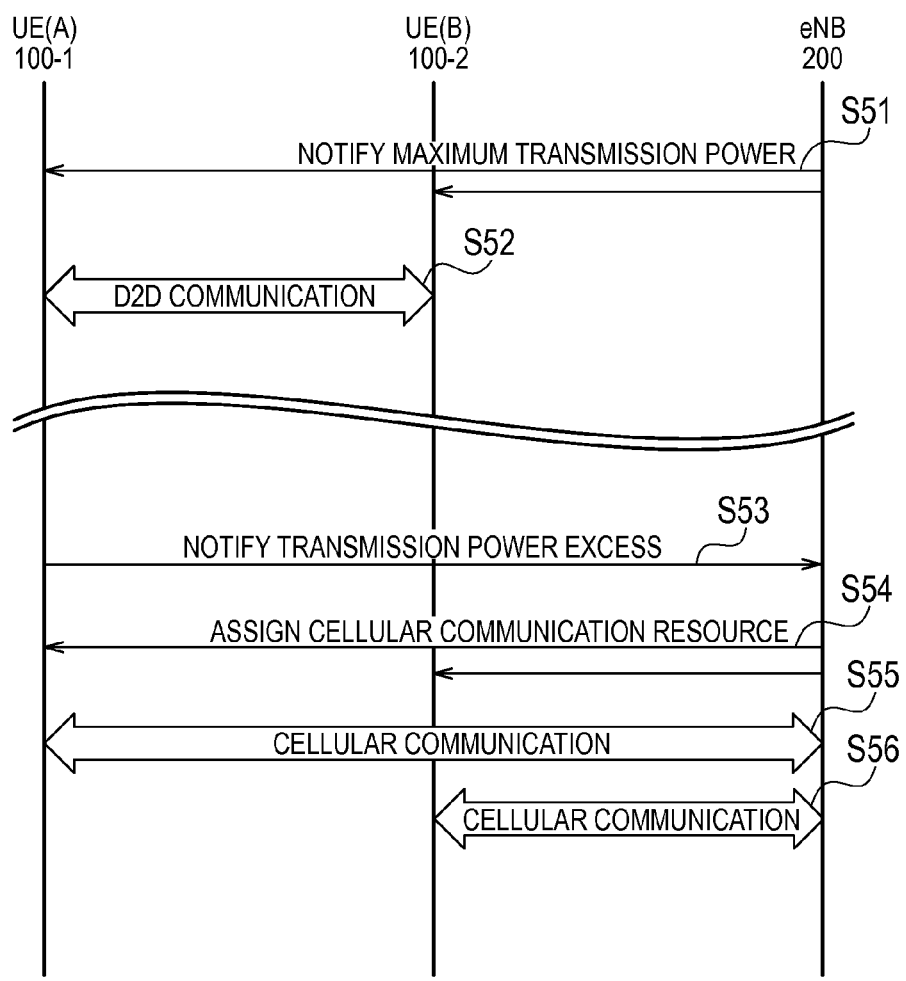
FIG. 15 is a sequence diagram when transmission power in the D2D communication exceeds maximum transmission power.

FIG. 15 is a sequence diagram when the transmission power in the D2D communication exceeds the maximum transmission power.

As illustrated in FIG. 15, in step S51, the eNB 200 transmits, on a broadcast channel (BCCH), maximum power information indicating maximum transmission power permitted in the D2D communication. Specifically, the eNB 200 puts the maximum power information into a master information block (MIB) or a system information block (SIB) and transmits the MIB or the SIB. When starting the D2D communication, the UE (A) 100-1 and/or the UE (B) 100-2 acquires and stores the maximum power information from the eNB 200.

In step S52, the UE (A) 100-1 and the UE (B) 100-2 perform the D2D communication. Hereinafter, the following description will be given on the assumption that the UE (A) 100-1 detects that the transmission power in the D2D communication exceeds the maximum transmission power.

In step S53, the UE (A) 100-1 notifies the eNB 200 of the fact that the transmission power in the D2D communication exceeds the maximum transmission power. In other words, the UE (A) 100-1 requests the eNB 200 to switch the D2D communication to the cellular communication.

In step S54, the eNB 200 instructs the UE (A) 100-1 and the UE (B) 100-2 to switch the D2D communication to the cellular communication, and performs the assignment of a radio resource for the cellular communication.

In steps S55 and S56, the UE (A) 100-1 and the UE (B) 100-2 switch the D2D communication to the cellular communication.

In accordance with the transmission power control according to the present embodiment, it is possible to appropriately control the transmission power in the D2D communication.

(3.4) Interference Avoidance Operation of D2D Communication

In the present embodiment, when the D2D communication receives interference from the cellular communication or another D2D communication, the interference is avoided by changing radio resource assignment.

Figure 16:
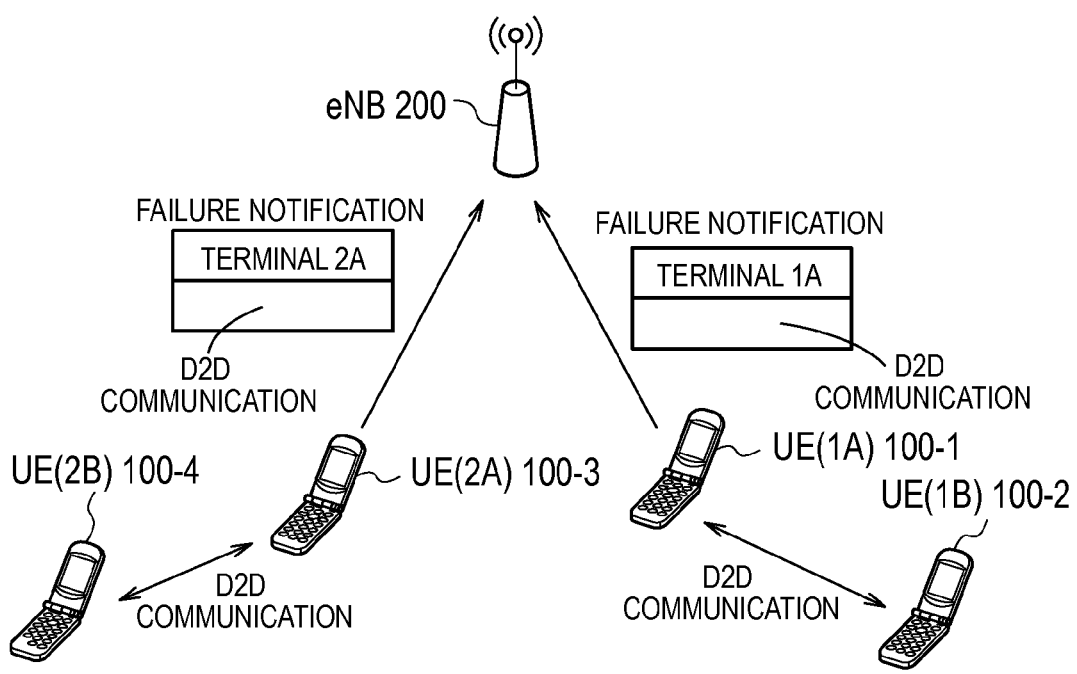
FIG. 16 is a diagram for explaining an interference avoidance operation according to the first embodiment (part 1).
Figure 17:
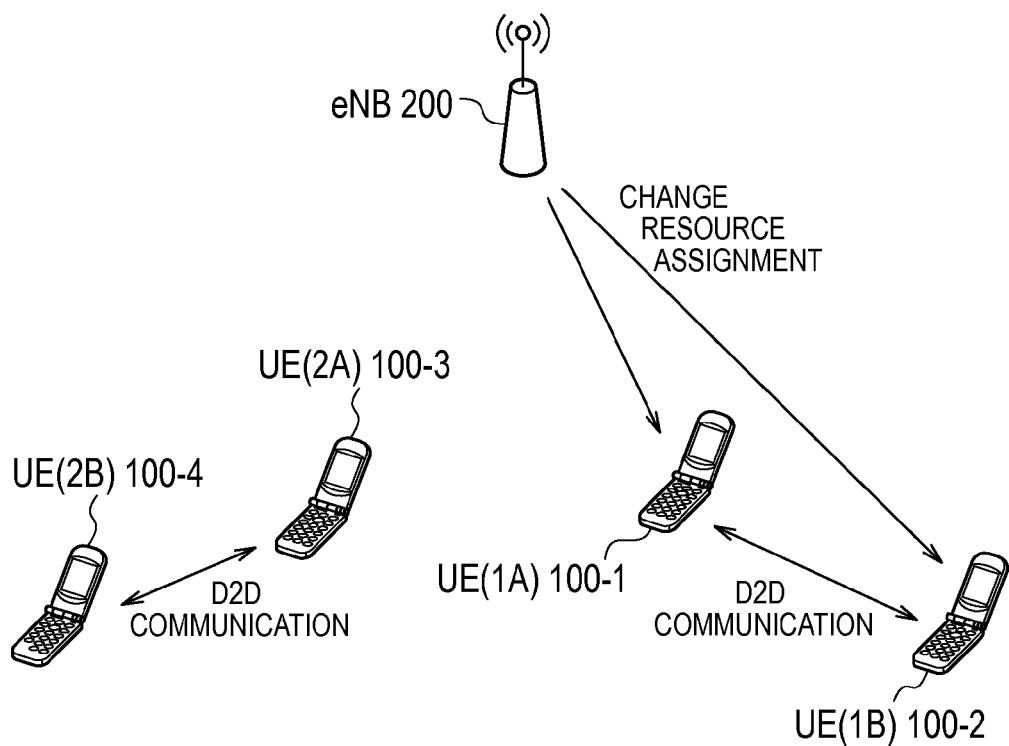
FIG. 17 is a diagram for explaining an interference avoidance operation according to the first embodiment (part 2).

FIG. 16 and FIG. 17 are diagrams for explaining an interference avoidance operation according to the present embodiment. In FIG. 16 and FIG. 17, a pair of UE (1A) 100-1 and UE (1B) 100-2 performs the D2D communication and a pair of UE (2A) 100-3 and UE (2B) 100-4 also performs the D2D communication. Furthermore, it is assumed that radio resources used in each D2D communication are equal to each other and receive the influence of interference from each other.

As illustrated in FIG. 16, when a reception failure is detected, the UE (1A) 100-1 transmits a failure notification related to the reception failure during the D2D communication, to the eNB 200. The reception failure indicates failure of reception at a reception timing (specifically, it is not possible to decode received data). The failure notification includes the identifier of the UE (1A) 100-1 and information indicating that the D2D communication is being performed. In addition, when it is possible to receive and decode an interference wave from the other D2D communication pair that is a cause of the reception failure, the UE (A) 100-1 may determine that the other D2D communication pair is an interference source and include information on the other D2D communication pair, in the failure notification.

Furthermore, similarly, when reception failure is detected, the UE (2A) 100-3 also transmits failure notification related to the reception failure during the D2D communication to the eNB 200. The failure notification includes the identifier of the UE (2A) 100-3 and information indicating that the D2D communication is being performed. In addition, when it is possible to receive and decode an interference wave from the other D2D communication pair that is a cause of the reception failure, the UE (2A) 100-3 may determine that the other D2D communication pair is an interference source and include information on the other D2D communication pair, in the failure notification.

When receiving each failure notification from the D2D communication pair including the UE (1A) 100-1 and the UE (1B) 100-2 and the D2D communication pair including the UE (2A) 100-3 and the UE (2B) 100-4, the eNB 200 determines whether each D2D communication pair uses the same radio resource in the D2D communication.

As illustrated in FIG. 17, when it is determined that each D2D communication pair uses the same radio resource in the D2D communication, the eNB 200 determines that each D2D communication pair receives the influence of interference from each other and changes the assignment of the radio resource of one D2D communication pair. For example, the eNB 200 reassigns a different radio resource to the D2D communication pair including the UE (1A) 100-1 and the UE (1B) 100-2. In this way, the interference of the D2D communication is avoided.

Second Embodiment

In the aforementioned first embodiment, the D2D-RNTI is assigned to the UE 100 in the following procedure. Firstly, the UE 100 secures LCG for the D2D communication with respect to the application to be used in the D2D communication, and secures a hardware resource for the D2D communication with respect to the LCG for the D2D communication. Secondly, the UE 100 notifies the eNB 200 of the LCG for the D2D communication. Thirdly, the eNB 200 assigns the D2D-RNTI to the LCG notified from the UE 100.

However, when the UE 100 performs the D2D communication with a plurality of communication partners UE by using the same application, it is preferable that it is possible to control the D2D communication for each communication partner UE. In this regard, in the present embodiment, the UE 100 secures the LCG for the D2D communication with respect to a combination of an application to be used in the D2D communication and other UEs 100 that are communication partners of the D2D communication.

Figure 18:
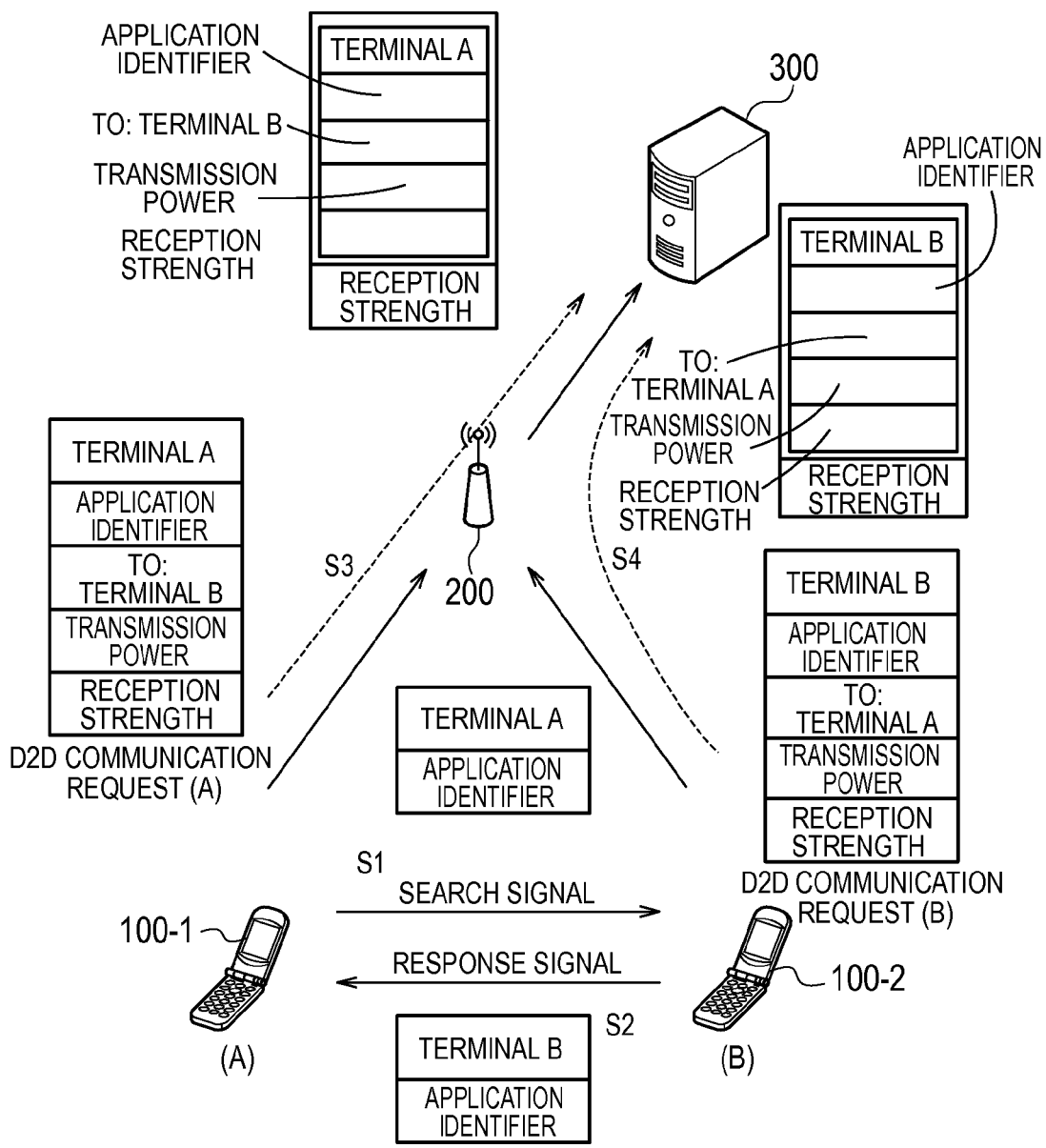
FIG. 18 is a diagram for explaining a D2D communication request operation according to a second embodiment.

Hereinafter, a communication control method according to the present embodiment will be described. FIG. 18 is a diagram for explaining the communication control method according to the present embodiment. Mainly, differences from the first embodiment will be described.

As illustrated in FIG. 18, in step S1, the UE (A) 100-1 transmits a search signal to the vicinity of the UE (A) 100-1.

In step S2, in response to the reception of the search signal from the UE (A) 100-1, the UE (B) 100-2 transmits a response signal to the UE (A) 100-1.

In step S3, in response to the reception of the response signal from the UE (B) 100-2, the UE (A) 100-1 transmits, to the eNB 200, a D2D communication request (A) indicating that the start of the D2D communication is desired.

As described in the first embodiment, the D2D communication request (A) includes the transmission source identifier indicating the transmission source UE (that is, the UE (A) 100-1) of the D2D communication request (A), the application identifier indicating the application to be used in the D2D communication, the transmission power information indicating the transmission power of the search signal, and the received power information indicating the received power of the response signal.

In the present embodiment, the D2D communication request (A) further includes a communication partner destination identifier indicating a communication partner UE (that is, the UE (B) 100-2) of the D2D communication.

When the D2D communication request (A) is received, the eNB 200 measures received power of the D2D communication request (A), adds information on the measured received power to the D2D communication request (A), and transfers the D2D communication request (A) to the MME/S-GW 300.

In step S4, in response to the transmission of the response signal, the UE (B) 100-2 transmits, to the eNB 200, a D2D communication request (B) indicating that the start of the D2D communication is desired.

As described in the first embodiment, the D2D communication request (B) includes the transmission source identifier indicating the transmission source UE (that is, the UE (B) 100-2) of the D2D communication request (B), the application identifier indicating the application to be used in the D2D communication, the transmission power information indicating the transmission power of the response signal, and the received power information indicating the received power of the search signal.

In the present embodiment, the D2D communication request (B) further includes a communication partner destination identifier indicating a communication partner UE (that is, the UE (A) 100-1) of the D2D communication.

When the D2D communication request (B) is received, the eNB 200 measures received power of the D2D communication request (B), adds information on the measured received power to the D2D communication request (B), and transfers the D2D communication request (B) to the MME/S-GW 300.

When the D2D communication request (A) and the D2D communication request (B) are received, the MME/S-GW 300 determines whether the D2D communication by the UE (A) 100-1 and the UE (B) 100-2 is possible on the basis of the D2D communication request (A) and the D2D communication request (B).

When it is determined that the D2D communication by the UE (A) 100-1 and the UE (B) 100-2 is possible, the MME/S-GW 300 notifies the eNB 200, the UE (A) 100-1, and the UE (B) 100-2 of necessary information and the fact that the D2D communication is possible. Then, the D2D communication is started under the control of the eNB 200.

As described above, the D2D communication request according to the present embodiment includes the application identifier and the communication partner destination identifier, so that the network (the eNB 200 and the MME/S-GW 300) is able to comprehend, by which application to be used and between which UEs, the D2D communication is performed.

Figure 19:
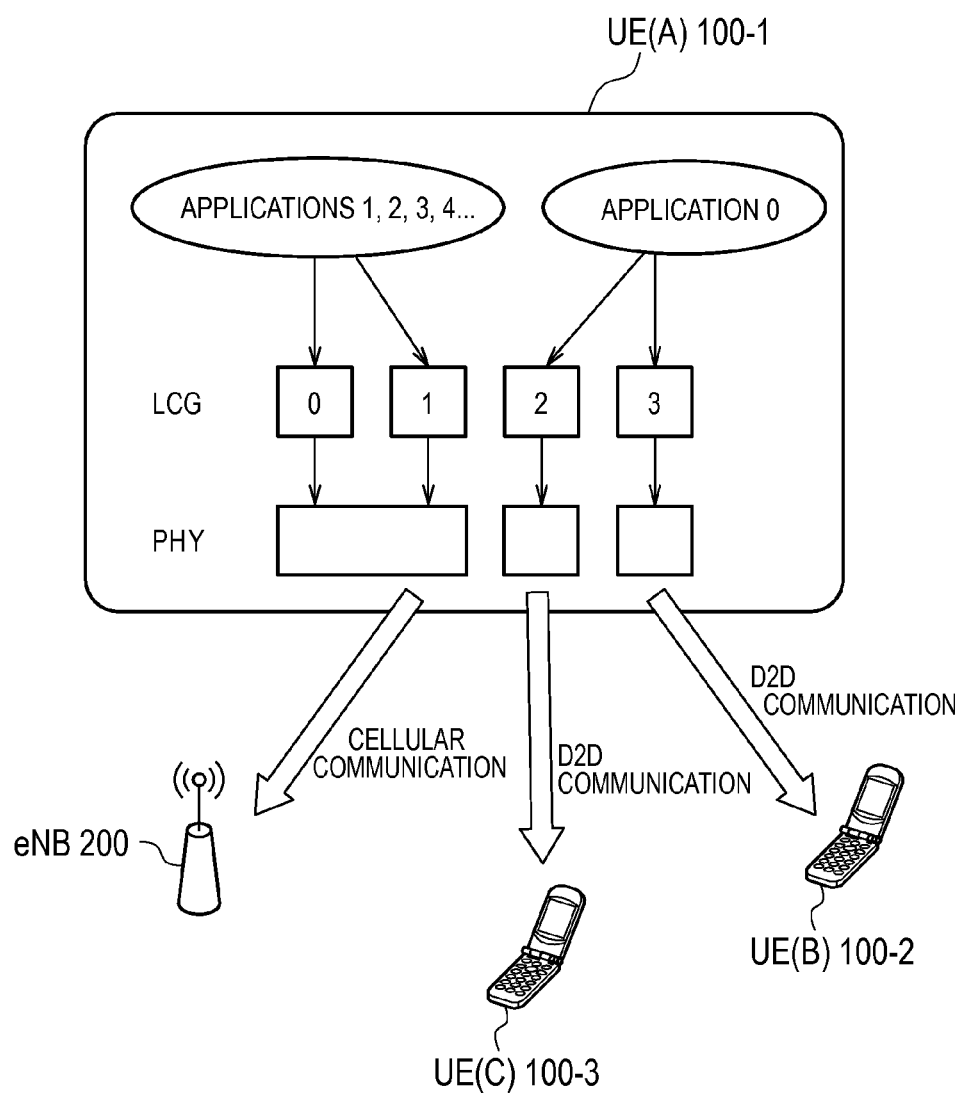
FIG. 19 is a diagram for explaining a D2D communication operation according to the second embodiment.

FIG. 19 is a diagram for explaining the communication control method according to the present embodiment. Mainly, differences from the first embodiment will be described. Next, a description will be provided for the case in which the UE (A) 100-1 simultaneously performs the cellular communication with the eNB 200, the D2D communication with the UE (B) 100-2, and the D2D communication with the UE (C) 100-3, and the case in which the UE (A) 100-1 uses the same application in each D2D communication.

As illustrated in FIG. 19, the UE (A) 100-1 secures the LCG 3 for a combination of application 0 to be used in the D2D communication and the UE (B) 100-2 that is a communication partner UE of the D2D communication. Then, the UE (A) 100-1 secures a hardware resource (a PHY resource) for the LCG 3 for the D2D communication. Moreover, the UE (A) 100-1 notifies the eNB 200 of the LCG 3 for the D2D communication. The eNB 200 assigns the D2D-RNTI to the LCG 3 notified from the UE (A) 100-1.

Furthermore, the UE (A) 100-1 secures the LCG 2 for a combination of the application 0 to be used in the D2D communication and the UE (C) 100-3 that is a communication partner UE of the D2D communication. Then, the UE (B) 100-2 secures a hardware resource (a PHY resource) for the LCG 2 for the D2D communication. Moreover, the UE (A) 100-1 notifies the eNB 200 of the LCG 2 for the D2D communication. The eNB 200 assigns the D2D-RNTI to the LCG 2 notified from the UE (A) 100-1.

As described above, according to the present embodiment, the UE (A) 100-1 secures LCGs different depending on each communication partner UE of the D2D communication, so that it is possible to separately transmit application data to each communication partner UE of the D2D communication. Furthermore, since D2D-RNTI different depending on each communication partner UE of the D2D communication is assigned, even when the UE 100 performs the D2D communication with a plurality of communication partners UE by using the same application, the eNB 200 is able to control the D2D communication for each communication partner UE.

In addition, as described in the first embodiment, during the D2D communication, the UE (A) 100-1 transmits the BSR MCE for each of the LCG 0 to the LCG 3 to the eNB 200. On the basis of the BSR MCE, the eNB 200 recognizes a transmission buffer stay amount indicated by the BSR for each of the LCG 0 to the LCG 3, and performs radio resource assignment corresponding to the transmission buffer stay amount for each of the LCG 0 to the LCG 3.

Other Embodiments

It should not be understood that those descriptions and drawings constituting a part of the present disclosure limit the present disclosure. Further, various substitutions, examples, or operational techniques shall be apparent to a person skilled in the art on the basis of this disclosure.

In the aforementioned embodiment, an entity determining whether the D2D communication is possible is the MME/S-GW 300. However, the eNB 200 may determine whether the D2D communication is possible.

In the aforementioned embodiment, an entity determining the method of assigning radio resource is the eNB 200. However, the MME/S-GW 300 may determine the method of assigning radio resource and notify the eNB 200 of a result of the determination. Furthermore, the aforementioned embodiment has described an example of determining the method of assigning radio resource on the basis of the identifier of an application. However, instead of the identifier of the application, an identifier of communication quality (that is, QoS) required for the application may be used. Such an identifier of the QoS is called QCI (QoS Class Identifier).

In the aforementioned embodiment, the eNB 200 transmits, on the broadcast channel (BCCH), the maximum power information indicating the maximum transmission power permitted in the D2D communication. However, the maximum power information may be individually transmitted to the UE 100. In this case, it is preferable that the eNB 200 determines the maximum transmission power permitted in the D2D communication in response to propagation loss between the eNB 200 and the UE 100. For example, as the propagation loss between the eNB 200 and the UE 100 is small, the eNB 200 determines the maximum transmission power permitted in the D2D communication to be small.

In addition, the entire contents of U.S. Provisional Application No. 61/656,166 (filed on Jun. 6, 2012) and U.S.

Provisional Application No. 61/694,017 (filed on Aug. 28, 2012) are incorporated in the present specification by reference.

INDUSTRIAL APPLICABILITY

As described above, the present disclosure is able to appropriately control the D2D communication, and thus is available for a radio communication field such as cellular mobile communication.

The invention claimed is:

1. A communication control method, comprising:
transmitting, from a user terminal to a base station, information indicating a logical channel group for Device-to-Device (D2D) communication, wherein the D2D communication is a direct communication performed between terminals;
assigning, by the base station, a radio network temporary identifier for the D2D communication, to the user terminal;
determining, by the base station, a radio resource to be used for the user terminal to perform the D2D communication;
transmitting, from the base station to the user terminal, resource information indicating the determined radio resource, by use of the radio network temporary identifier assigned to the user terminal; and
receiving, by the user terminal, the resource information on a basis of the radio network temporary identifier assigned to the user terminal.

2. The communication control method according to claim 1, further comprising:
transmitting, from the user terminal to the base station, buffer information indicating an amount of data waiting for transmission in the D2D communication, wherein
in the determining the radio resource, the base station determines the radio resource on a basis of the buffer information received from the user terminal.

3. A user terminal, comprising:
a transmitter;
a receiver; and
a controller communicatively coupled to a memory and configured to control the transmitter and the receiver, wherein
the transmitter is configured to transmit, to a base station, information indicating a logical channel group for Device-to-Device (D2D) communication, wherein the D2D communication is a direct communication performed between terminals, and
the receiver is configured to receive, from the base station, resource information transmitted by use of the radio network temporary identifier, on a basis of the radio network temporary identifier assigned to the user terminal, wherein the resource information indicates a radio resource to be used for the user terminal to perform the D2D communication, the radio resource being determined by the base station.

4. A processor, communicatively coupled to a memory, the processor for controlling a user terminal, wherein
the processor performs processes of:
transmitting, to a base station, information indicating a logical channel group for Device-to-Device (D2D) communication, wherein the D2D communication is a direct communication performed between terminals, and
receiving, from the base station, resource information transmitted by use of the radio network temporary identifier, on a basis of the radio network temporary identifier assigned to the user terminal, wherein the resource information indicates a radio resource to be used for the user terminal to perform the D2D communication, the radio resource being determined by the base station.

5. A non-transitory storage medium, wherein
the storage medium stores therein a program for causing a user terminal to perform processes of:
transmitting, to a base station, information indicating a logical channel group for Device-to-Device (D2D) communication, wherein the D2D communication is a direct communication performed between terminals, and
receiving, from the base station, resource information transmitted by use of the radio network temporary identifier, on a basis of the radio network temporary identifier assigned to the user terminal, wherein the resource information indicates a radio resource to be used for the user terminal to perform the D2D communication, the radio resource being determined by the base station.

6. A base station, comprising:
a transmitter;
a receiver; and
a controller communicatively coupled to a memory and configured to control the transmitter and the receiver, wherein
the receiver is configured to receive, from a user terminal, information indicating a logical channel group for Device-to-Device (D2D) communication, wherein the D2D communication is a direct communication performed between terminals,
the controller is configured to assign a radio network temporary identifier for the D2D communication, to the user terminal,
the controller is configured to determine a radio resource to be used for the user terminal to perform the D2D communication, and
the transmitter is configured to transmit, to the user terminal, resource information indicating the determined radio resource, by use of the radio network temporary identifier assigned to the user terminal.

* * * * *